May 11, 1965 G. E. GROSSNICKLE ETAL 3,183,041
COMBINED BRAKE ADJUSTER AND TORQUE LIMITER
Filed July 1, 1963
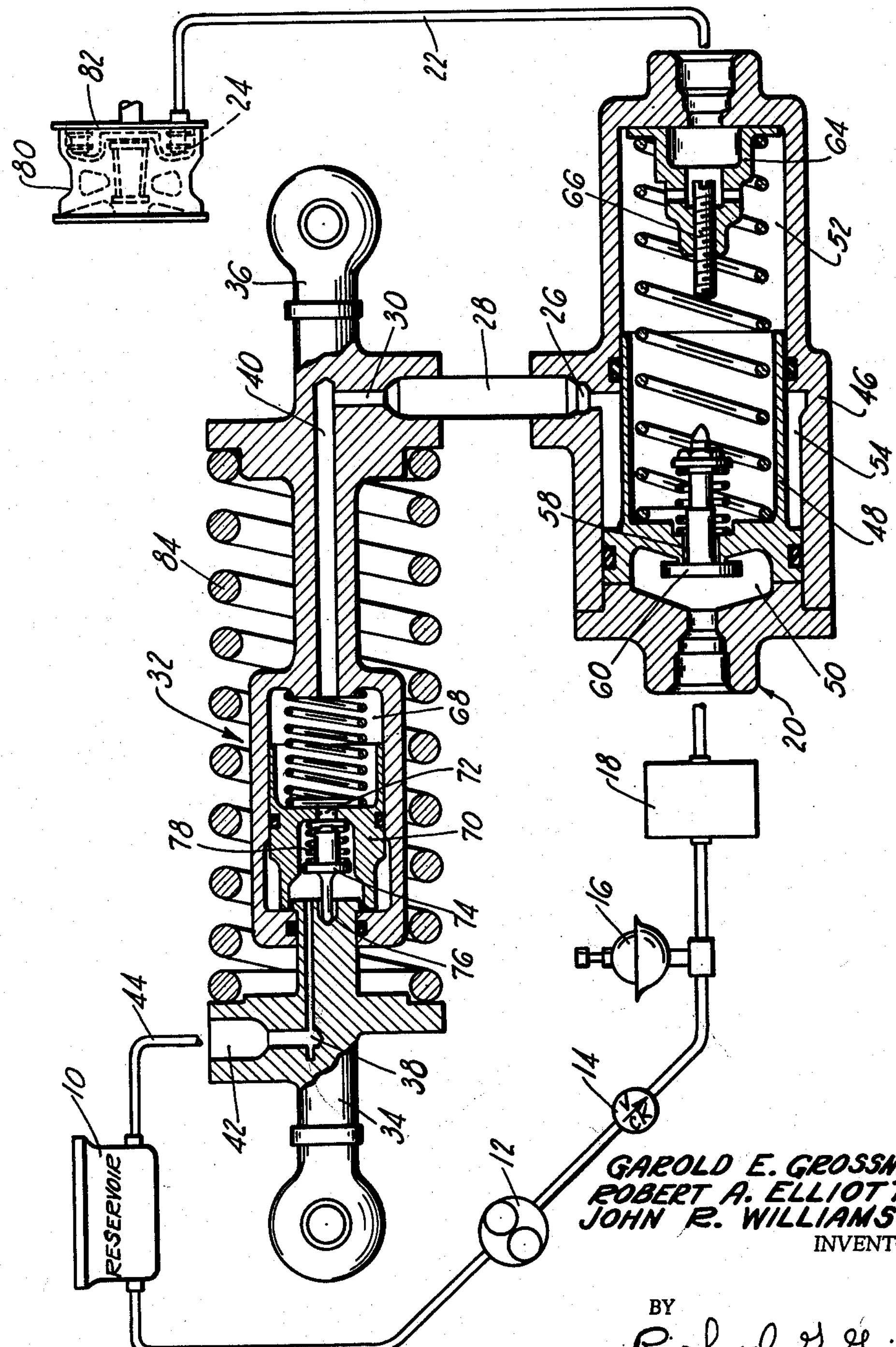
GAROLD E. GROSSNICKLE
ROBERT A. ELLIOTT
JOHN R. WILLIAMSON
INVENTORS
BY
Richard G Geib
ATTORNEY United States Patent Office 3,183,041
Patented May 11, 1965

3,183,041
COMBINED BRAKE ADJUSTER AND TORQUE LIMITER

Garold Eugene Grossnickle, Robert A. Elliott, and John R. Williamson, South Bend, Ind., assignors to The Bendix Corporation, South Bend, Ind., a corporation of Delaware Filed July 1, 1963, Ser. No. 291,730
3 Claims. (Cl. 303—49)

This invention relates to a brake system wherein an automatic brake adjuster is provided to enable increasing the amount of brake fluid between the adjuster and a pressure responsive braking device to thereby minimize the running clearance afforded such brakes.

In addition the invention also is concerned with providing a means in connection with the brake adjuster to prevent brake operation which would create a torque in excess of a predetermined amount.

It is therefore a principal object of our invention to provide a brake adjusting means that is connected with a torque limiter such that torque limiting is related to brake pressure. This means that at low as well as at high brake pressures, torque limiting will begin at a low or a high, respectively, torque value in that brake pressure acts in opposition to the sensor pressure acting in a piston control chamber of our brake adjusting mechanism.

It is also an object of our invention to provide a brake adjuster and torque limiting mechanism combined in a brake system such that excessive torque will be reduced even when a brake valve tends to schedule higher braking torque, in that torque limiting, when required, overrides the normal procedure.

Still another object of our invention is to activate the torque limiting means with hydraulic pressure in such a manner that hydraulic failure of the sensor or torque limiting means will not result in any loss of braking capability. In other words, the sensor and the brake adjusting means have separate hydraulic circuitry.

Other and further objects and advantages of our system will appear in the following description of the accompanying drawing showing a sectioned brake adjusting means and torque limiting or sensor mechanism in combination in a braking system which is schematically shown.

With more particular regard to the drawing, we show a full hydraulic power system consisting of a fluid reservoir 10, a constant pressure pump 12 with a flow controlling check valve 14, and an accumulator 16 supplying a brake valve 18. As may be understood by those skilled in the art, the pump 12 may be of the bypass type or variable displacement type in that a constant pressure will be supplied to valve 14 of a predetermined magnitude. It should also be understood, as shown, that appropriate conduits connect the respective parts, one to the other. From the brake valve 18 we provide a conduit which terminates in a brake adjusting means 20 from whence the fluid flows as by conduit 22 to a pressure responsive braking means 24 shown in phantom.

A port is provided in the side of our brake adjusting means and is connected by a conduit 28 to a port 30 of a torque limiting or sensor device 32 in accordance with our invention. The sensor device comprises two telescopically arranged links 34 and 36, both of which have internal passages 38 and 40, respectively. As seen, the port 30 is connected to the passage 40 by appropriate means; whereas, passage 38 terminates in a port 42 that is connected by a conduit 44 to the reservoir 10.

Our brake adjuster 20 may be more particularly described as including a housing 46 bored so as to provide a stepped chamber therein. We slidably mount a piston 48 within said stepped chamber such that a first variable volume chamber 50, a second variable volume chamber 52 and an annular variable volume chamber 54 is formed within the housing 46. As seen, the piston is such as to have an opening 58 therethrough controlled by a spring biased valve 60, and the piston is normally held to the left by a spring 62. At the right end of the housing 46 we have mounted a pintle carrying framework 64 having an adjustable pintle 66 adapted to cooperate with the valve 60 when the piston 48 has traversed a predetermined distance within the second chamber 52 to thereby communicate chambers 50 and 52 through opening 58 and piston 48 due to the fact that the valve 60 is forced to move off its seat on the forward face of the piston. Thus, when the running clearance in the pressure responsive brake device 24 is high, the piston 48 will travel beyond the point normally required to engage the braking means so that further fluid from brake valve 18 may be supplied to the pressure responsive device to thereby insure braking. Upon release of the brakes, as by closing the brake valve 18, the valve 60 will close due to piston 48 being returned to the left by the action of spring 62 to thereby trap the additional fluid within the chamber 52, the conduit 22, and the pressure responsive braking device 24, thereby taking the running clearance and adjusting the brake system.

The annular chamber 54 is communicated by way of port 26 and conduit 28 and port 30 and passage 40 to a chamber 68 within the structure of the link 36. The link 34 is sealingly and slidably mounted such as to project into the retract from the chamber 68 at the end opposite the inlet of passage 40 thereto. A piston 70 is slidably mounted within the chamber 68, and the piston has a central orifice 72 therethrough so as to communicate one side of the chamber 68 with the other and consequently communicate passages 40 and 38. A spring responsive valve 74 is held within a receiving groove 76 of link 34 by the action of spring 78, so as to be aligned with but free of the orifice 72 under normal conditions, as seen in the drawing, when the link is fully extended. The link 36 is connected to fixed structure (not shown) surrounding the wheel 80 carrying the pressure responsive brake means 24; whereas the link 34 is connected to the brake carrying backing plate 82 for the pressure responsive brake means 24 so that upon applying the brakes a compressive force is created on link 34 in opposition to a preload spring 84 thereby closing orifice 72 by valve 74 being pressed thereinto such that further compressive forces will cause movement of piston 70 to increase the pressure in annular chamber 54 which will oppose the brake actuating pressure in the first chamber 50 of the brake adjusting mechanism 20. Although a compressive device is shown, a tensional or torsional sensor can be used without destroying the intent of our invention, as found in the aforementioned instruction.

In operation and under normal braking conditions, fluid flows from the brake valve 18, master cylinder, or other braking device, to the adjuster 20. The adjuster piston 48 moves downward and forces fluid from the adjuster chamber into the brake 24. At the same time, fluid is forced from the piston control chamber, the annular chamber 54, to the passages 40 and the orifice 72 and passage 38 to a compensator or reservoir 10, as shown.

Under abnormal conditions such as when the sensor 32 is compressed in the form shown, the check valve 74 closes and fluid is forced from the sensor into the annular chamber 54. If, for example, the piston 48 has moved to such a position as to have removed the poppet valve 60 from the seat on the piston 48, the pressure in the annular chamber 54 will move the piston 48 away from the adjustable pintle 66 to close the poppet valve. Further movement reduces the brake pressure by increasing the adjuster chamber or second chamber 52 volume. When the brake pressure is lowered, the torque is reduced and the sensor expands to its installed position. The valve 74 opens, thus venting the piston control chamber 54 to either a compensator or a reservoir whereupon braking can continue in a normal manner.

If desired an orifice control mechanism may be incorporated into conduit 28 to control response when torque is released.

Having now particularly described and ascertained the nature of said invention and in what manner the same can be performed without regard to limting the scope thereof, our intention is to be solely limited by the following claims.

We claim:

1. In a fluid brake system including a reservoir for said fluid, a pump to pressurize said fluid, an accumulator for holding said fluid above a predetermined pressure, a valve controlling delivery of said pressurized fluid and a pressure responsive brake means, a means to automatically adjust the amount of fluid in said brake system and to limit the torque of the brake system, which means comprises:

a brake adjuster in series connection between said valve and said pressure responsive brake means, said adjuster having a housing, a stepped chamber therein, a piston adapted to divide said chamber into a first, a second, and an annular chamber, a normally closed valve controlling communication of said first and second chambers to an opening in said piston wall separating said chambers, a resilient means for returning said piston to its normal position such that said second and said annular chambers are at their greatest volume, whereas said first chamber is of reduced volume, in this, the normal non-energized position of said piston, and a pintle for opening said valve when said piston has traversed a predetermined distance to communicate said first and second chamber;

a port in said housing registering with said annular chambers;

a torque sensing device interposed with said port and said reservoir with fluid control means monitoring the fluid communication thereof, said torque sensing device including a telescopic link having first and second members where one of said members is adapted to slide into a chamber in the other of said members, a piston in said chamber creating two variable volume chambers therein communicated by an orifice through said piston, a spring biased valve means operatively interposed with said one of said members and said piston such that normally said valve does not close said orifice until said members are moved with respect to each other, port means connecting one of said chambers to said annular chamber and the other to said reservoir, and means to connect one of said members to a brake carrying framework and to a fixed structure adjacent thereto such that brake torque will bring about the aforementioned telescopic movement; and a spring interposed to oppose movement of said members with respect to each other.

2. A fluid brake system comprising:

a brake actuating means;

a pressure responsive brake means in fluid communication with said brake actuating means;

a brake adjuster interposed between said brake actuating means and said pressure responsive brake means in said fluid communicating means, said brake adjuster having a housing having a piston therein adapted to first pressurize a column of fluid for actuating said brake means in response to said brake actuator and second to replenish the column of fluid to allow for wear of said brake means;

a port in said housing registering with an annular chamber in said brake adjuster formed between said housing and said piston about said piston;

a torque sensing device interposed with said port and a reservoir, said device including a fluid control means monitoring the fluid communication therethrough so as to prevent said communication when said brake means has created a torque in excess of a predetermined amount to thereby create excessive pressure in said annular chamber resisting movement of said piston to apply said brake means; and a yieldable means for preventing the termination of communication between said port and said reservoir.

3. A fluid brake system comprising:

a brake actuating device;

a pressure responsive brake means in fluid communication with said brake actuating device;

a brake adjuster interposed between said brake actuating device and said brake means in said fluid communication, said brake adjuster having a housing constructed such that a piston operatively arranged therein will prescribe a first variable volume chamber, a second variable volume chamber, and a third variable volume chamber, with said first variable volume chamber being connected to said brake actuating device, said second variable volume chamber being connected to said pressure responsive brake means and said third variable volume chamber being open to a port in said housing such that said second and third variable volume chambers are decreased in volume as said first variable volume chamber is increased;

a torque sensing device operatively connected to said port of said housing, said torque sensing device including a fluid control means for monitoring the flow from said third variable volume chamber through said torque sensing device consisting of a telescopic link having first and second members where one of said members is adapted to slide into a chamber in the other of said members, a piston in said chamber creating two variable volume chambers therein communicated by an orifice through said piston, a spring biased valve means operatively interposed with said one of said members and said piston such that normally said valve does not close said orifice until said members are moved with respect to each other, port means connecting one of said variable volume chambers to said third chamber, port means exhausting said other of said chambers, and means to connect one of said members to a brake carrying frame-work for said pressure responsive brake means and to a fixed structure adjacent thereto such that brake torque will bring about the aforementioned telescopic movement;

a fluid reservoir operatively connected to said port exhausting said other chamber of said torque sensing device and to said brake actuating device; and a spring interposed to oppose movement of said first and second members of said telescopic link with respect to each other.

References Cited by the Examiner

UNITED STATES PATENTS

| | | | |
|---|---|---|---|
| 2,212,409 | 8/40 | Stewart | 188—181 |
| 2,736,395 | 2/51 | Keeler | 188—181 |
| 2,868,338 | 1/59 | Lucien et al. | 188—161 |
| 2,975,003 | 3/61 | Sandor | 188—181 |
| 3,069,858 | 12/62 | Elliott | 188—196 |

FOREIGN PATENTS

| | | |
|---|---|---|
| 688,042 | 2/53 | Great Britain. |

ARTHUR L. LA POINT, *Primary Examiner.*